(No Model.)
J. E. EMERSON.
SAW.
No. 281,252. Patented July 17, 1883.
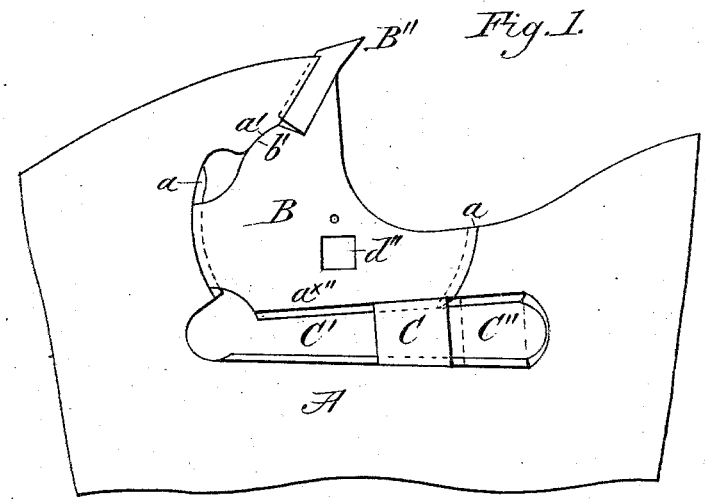
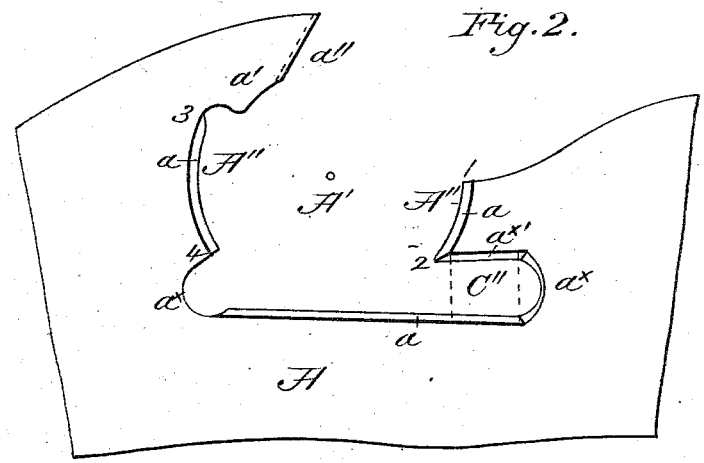
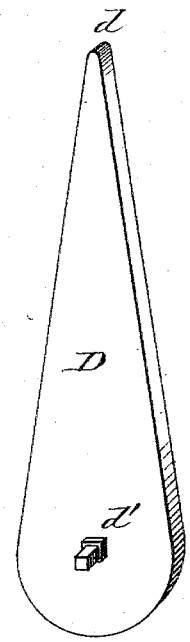
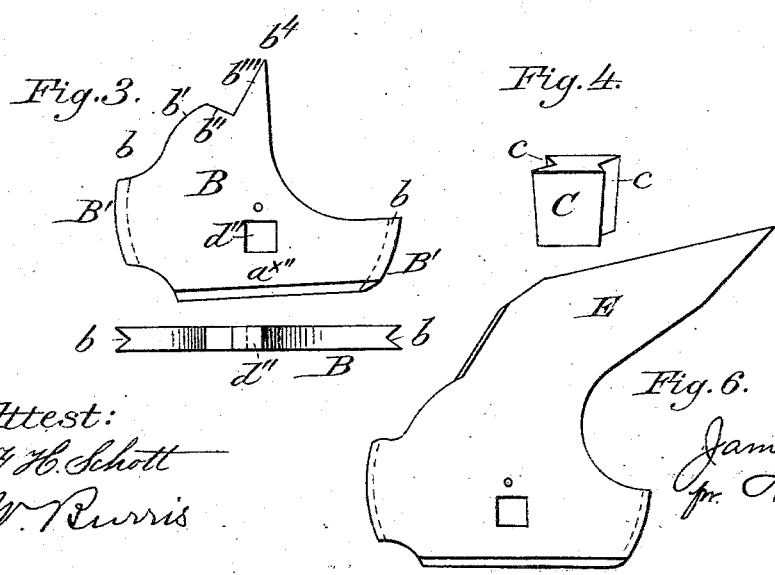
Attest:
F. H. Schott
W. Burris
Inventor:
James E. Emerson
pr. N. Cranford
atty.

UNITED STATES PATENT OFFICE.

JAMES E. EMERSON, OF BEAVER FALLS, PENNSYLVANIA.

SAW.

SPECIFICATION forming part of Letters Patent No. 281,252, dated July 17, 1883.

Application filed April 28, 1883. (No model.)

*To all whom it may concern:*

Be it known that I, JAMES E. EMERSON, a citizen of the United States, residing at Beaver Falls, in the county of Beaver and State of Pennsylvania, have invented certain new and useful Improvements in Saws having Insertible Teeth; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to improve circular or other saws in which are insertible cutting-teeth in such manner that the teeth are clamped and held in their places in a more secure way, upon a new method and without danger of loss of parts in removing. The invention also improves the saw having the construction to receive insertible teeth to saw hard or soft wood by an exchange of teeth in same saw-plate; and to this end it consists in the construction of the recess in the saw-plate to receive the cutting-tooth and the clamping devices.

In the drawings, Figure 1 represents the side of a section of a saw-plate having the cutting-tooth and its clamping devices therein. Fig. 2 represents the side of a section of a saw-plate with the cutting-tooth and clamping device removed. Fig. 3 represents the throat or clamping piece removed from the saw-plate in side and longitudinal edge view. Fig. 4 represents a clamping-wedge removed. Fig. 5 represents in side view a wedge and socket wrench; and Fig. 6 represents in side view a tooth to be, when necessary, inserted in the saw-plate in place of the clamping-piece.

In many localities it is necessary to saw at the same mill and with the same saw cut both hard and soft wood, and it is evident that the same form of tooth will not cut advantageously both hard and soft wood; but by this invention, with but little interruption or loss of time, the same saw-plate can, by an exchange of cutting-teeth, be made available to cut either kind of wood by the most approved form of tooth, by an interchange of teeth in the same saw-plate.

A represents a side view of a section of a saw-plate, and A' represents the recess or opening in the saw-plate in which are placed the cutting-tooth, the throat or clamping piece, and the clamping-wedge. This recess is of the form seen in Fig. 2, having an elongated base terminating at circular lines $a^\times$ at each end, and having a sharp ridge, $a$, on its base between the terminal circles, to guide and keep the clamping-wedge in place. A'' A'' are sections of a circle forming bearing-points for the clamping-piece to rotate in and be secured between, and extends on the forward portion from 1 to 2, and on the rear portion of the circle from 3 to 4, and these parts of a circle have inwardly-projecting ridges $a$, to keep the clamping-piece in place.

At $a'$ is a short section of a circle in the recess, which has a shorter radius from the same center than A'', which serves as a support or firm bearing for the outer portion of the throat or clamping piece, and from the outer terminal of this circular line $a'$ the recess is on a straight oblique line, $a''$, to the circumference of the saw-plate, and in which straight line is a V-shaped groove to receive the back of the cutting-tooth, as shown by dotted lines, Figs. 1 and 2.

B is the throat or clamping piece having a straight base, with the sharp ridge $a$ to guide and keep the clamping-wedge in place, has the segments of a circle, B' B', to agree with the circle-sections A'' A'' in the recess of the saw-plate, and having V-shaped grooves $b$ therein to fit the ridges $a$ in the circle A'' in the recess, and so as to rotate therein and be securely held from any transverse or side movement.

At $b'$ is a circular part to abut against the circular part $a'$ of the recess of the saw-plate, and at the outer terminus of this circular part is a straight line, $b''$, but at an angle from a radial line for a distance to receive the thickness of the cutting-tooth, when a line, $b'''$, at a right angle or nearly at a right angle thereto, is made to extend to the outer point, $b^4$, of the throat or clamping piece, as seen in Fig. 3, between which line $b'''$ and the straight part $a''$ of the saw-plate the cutting-tooth is securely clamped.

C is the sliding clamping-wedge, tapering or of less width at one end than at the other, and has V-shaped grooves $c$ in its tapering edges, as seen in Fig. 4.

C' is a tapering slot formed by the inner straight line of the recess A' in the saw-plate, and between the circular lines $a^\times$ on the inner side, and by the short straight line $a^{\times\prime}$ on its outer side, and the base straight line $a^{\times\prime\prime}$ of the clamping-piece B, as seen when the clamping-piece is in place in Fig. 1.

D is a tapering wedge and socket wrench, to drive the wedge C under the clamping-piece B or to loosen the clamp on the tooth, when desired, by placing the point $d$ in slot C', between the wedge C and the circular ends of slot C', and forcing the wedge under the piece B, to clamp the tooth or to force the wedge into that part of the slot C' indicated by letter C'', that is wholly in the saw-plate, to relieve the clamping-piece, so that the tooth is free to be removed by inserting the projecting socket-wrench $d'$ on the side of wrench D into the socket or opening $d''$ in the clamping-piece B, and turning it in the circular lines A'', to open the outer clamping-points, when the tooth can be removed from the saw-plate.

This construction is an improvement upon that shown in my patent of April 25, 1871, No. 113,992, and subsequent patents in which the throat or clamping piece is made to clamp the tooth by means of a wedge, the difference being that in this invention the throat or clamping-piece bears against and rotates within a given circle or on the same circle, A'', which will always retain the throat-piece in place while a tooth is being taken from or to be inserted in the saw-plate. Another advantage is in making the slot for the clamping-wedge extend into the saw-plate to be clear of the clamping-piece when it is being inserted or when turned to relieve the tooth, and give it freedom to be taken out, or a new one to be inserted, as the forward end of the lower edge of the clamping-piece is turned down into the slot below the line $a^{\times\prime}$, which will keep the wedge from dropping out and being lost.

It is generally understood that the form of tooth seen in Fig. 1 is best adapted to successfully saw hard wood, and to have a different form of tooth to saw soft wood, and be secured in the same saw-plate by an exchange of one kind of tooth B' and throat or clamping piece B for the tooth E, (shown in Fig. 6,) and having the same form as the clamping-piece in so far as the clamping it in place in the saw-plate is concerned, but has a different construction of cutting-point, such a point as is generally used for sawing soft wood, which tooth is quickly and easily inserted in the same recess of the saw-plate and secured by the same means and in the same way as is the clamping-piece, which is a great convenience in many localities, as such an interchange of teeth in one saw-plate saves the cost of one saw.

Having thus described my invention, what I claim, and desire to secure by Letters Patent, is—

1. The removable throat or clamping piece B, having the bearing-points B' upon the same circle, in combination with the segments of a circle, A'', in the recess of the saw-plate, having the same radius as circle B', as and for the purposes described.

2. The removable throat or clamping piece B, having the bearing-points B' upon the same circle, abutting point $b'$ on a circle from the same center, but of a shorter radius than circle B', in combination with the recess A' in the saw-plate, constructed substantially as described.

3. In a saw-blade having insertible teeth, the removable throat or clamping piece B, having bearing-points B' on opposite sides thereof, which are on the same circle and radius, the recess A' in the saw-blade to receive the throat-piece having its bearing-points A'' on the same circle as B', in combination with the clamping-wedge C in tapering slot C', as described.

4. In a saw-blade having the recess A' to receive a removable throat-piece, B, and clamped therein by wedge C, the tapering slot C', having the part C'', to receive and hold the wedge wholly in the blade of the saw, in the manner and for the purpose described.

In testimony whereof I affix my signature in presence of two witnesses.

JAMES E. EMERSON.

Witnesses:
S. H. BRACKEN,
ALONZO B. MCKENZIE.